United States Patent
Huang

(10) Patent No.: US 9,395,005 B2
(45) Date of Patent: Jul. 19, 2016

(54) COMPACT TWO-WAY CARTRIDGE VALVE USING COMBINED FLANGE-CONTROLLED PLATE

(75) Inventor: Renhao Huang, Shanghai (CN)

(73) Assignee: Shanghai Renhao Hydraulic Technology, Co., LTD, Shanghai, Changning District (CN)

( * ) Notice: Subject to any disclaimer, the term of this patent is extended or adjusted under 35 U.S.C. 154(b) by 523 days.

(21) Appl. No.: 13/819,746

(22) PCT Filed: Aug. 11, 2011

(86) PCT No.: PCT/CN2011/078255
§ 371 (c)(1),
(2), (4) Date: Feb. 28, 2013

(87) PCT Pub. No.: WO2012/028050
PCT Pub. Date: Mar. 8, 2012

(65) Prior Publication Data
US 2013/0153057 A1  Jun. 20, 2013

(30) Foreign Application Priority Data

Sep. 2, 2010 (CN) .......................... 2010 1 0280504

(51) Int. Cl.
*F16K 27/00* (2006.01)
*F16K 15/02* (2006.01)
(Continued)

(52) U.S. Cl.
CPC .............. *F16K 15/02* (2013.01); *F15B 13/043* (2013.01); *F15B 13/0405* (2013.01);
(Continued)

(58) Field of Classification Search
CPC ... F16K 27/003; F16K 15/02; F15B 13/0835;
Y10T 137/7758; Y10T 137/7762; Y10T 137/7768; Y10T 137/7764; Y10T 137/7769; Y10T 137/5109; Y10T 137/87885; Y10T 137/87901
USPC ......... 137/488, 485, 269, 271, 884, 886, 492, 137/489.5, 489, 494, 495, 454.5
See application file for complete search history.

(56) References Cited

U.S. PATENT DOCUMENTS 3,373,763 A * 3/1968 Smilges et al. ............... 137/269
3,613,717 A * 10/1971 Smith .......................... 137/491
(Continued)

FOREIGN PATENT DOCUMENTS

CN         2145867 Y    11/1993
CN       101167146 A     4/2008
(Continued)

OTHER PUBLICATIONS

International Search Report, Application No. PCT/CN2011/078255 dated Nov. 24, 2011.

*Primary Examiner* — Craig Schneider
*Assistant Examiner* — Minh Le
(74) *Attorney, Agent, or Firm* — MacMillan, Sobanski & Todd, LLC

(57) ABSTRACT

A compact two-way cartridge valve with combined flanged cover includes combined flanged covers, miniaturized pilot control assemblies and main stage of seated poppet valve, or combined flanged covers and main stage of seated poppet valve, or combined covers and miniaturized pilot assemblies and main stage of seated poppet valve. The present invention can overall realign all the two-way cartridge valve products currently on the market, and innovate new series of MINISO compact two-way cartridge valves in the specifications of 10 mm, 16 mm, 25 mm, 32 mm, and will change the quo-status of hydraulic drive and control system, that is the two-way cartridge valves currently are mainly used for large power or flow situations, and can make two-way cartridge valves applied for medium and small power or flow situations, which are the majority of the market in the hydraulic drive and control system.

13 Claims, 10 Drawing Sheets

(51) Int. Cl.
*F15B 13/04* (2006.01)
*F15B 13/043* (2006.01)
*F16K 31/40* (2006.01)
*F16K 31/42* (2006.01)
*F15B 13/08* (2006.01)

(52) U.S. Cl.
CPC .......... *F15B 13/0835* (2013.01); *F16K 27/003* (2013.01); *F16K 31/406* (2013.01); *F16K 31/42* (2013.01); *Y10T 137/7758* (2015.04)

(56) References Cited

U.S. PATENT DOCUMENTS

| | | | | |
|---|---|---|---|---|
| 3,862,738 A * | 1/1975 | Stumpmeier | ................... | 251/43 |
| 4,082,108 A * | 4/1978 | Dininio | ................... | 137/269.5 |
| 4,301,832 A * | 11/1981 | Smith | ................... | 137/512 |
| 4,340,086 A * | 7/1982 | Hemm et al. | ................... | 137/554 |
| 4,382,451 A * | 5/1983 | Lowe | ................... | 137/596.16 |
| RE31,529 E * | 3/1984 | Lowe | ................... | 137/884 |
| 4,478,245 A * | 10/1984 | Bender | ................... | 137/554 |
| 4,531,540 A * | 7/1985 | Meister | ................... | 137/492.5 |
| 4,535,966 A * | 8/1985 | Post et al. | ................... | 251/31 |
| 4,570,674 A * | 2/1986 | Kaye | ................... | 137/624.18 |
| 4,618,123 A * | 10/1986 | Bilharz et al. | ................... | 251/28 |
| 4,727,899 A * | 3/1988 | Massey et al. | ................... | 137/270 |
| 4,879,912 A * | 11/1989 | Suckow | ................... | 73/861.61 |
| 4,896,692 A * | 1/1990 | Baun | ................... | 137/269 |
| 4,896,694 A * | 1/1990 | Rausch | ................... | 137/491 |
| 4,972,870 A * | 11/1990 | Changnian et al. | ................... | 137/269 |
| 5,040,565 A * | 8/1991 | Karakama et al. | ................... | 137/596.15 |
| 5,131,427 A * | 7/1992 | Latza | ................... | 137/489 |
| 5,205,531 A * | 4/1993 | Kolchinsky | ................... | 251/30.04 |
| 5,209,255 A * | 5/1993 | Dehio | ................... | 137/115.14 |
| 5,277,224 A * | 1/1994 | Hutton et al. | ................... | 137/597 |
| 5,421,545 A * | 6/1995 | Schexnayder | ................... | 251/30.02 |
| 5,515,879 A * | 5/1996 | Mollo | ................... | 137/115.04 |
| 5,538,034 A * | 7/1996 | Schwegler | ................... | 137/454.5 |
| 5,794,651 A * | 8/1998 | Miller | ................... | 137/454.5 |
| 5,873,561 A * | 2/1999 | Bourkel et al. | ................... | 251/36 |
| 5,906,352 A * | 5/1999 | Post | ................... | 251/44 |
| 5,975,486 A * | 11/1999 | Dettmann | ................... | 251/30.02 |
| 6,431,210 B1 * | 8/2002 | Lowe et al. | ................... | 137/599.18 |
| 7,721,764 B2 * | 5/2010 | Louwagie et al. | ................... | 137/884 |
| 7,891,379 B2 * | 2/2011 | Albrecht et al. | ................... | 137/884 |
| 2005/0133102 A1 | 6/2005 | Blackman et al. | ................... | 137/884 |
| 2008/0173840 A1 | 7/2008 | Godert et al. | | |
| 2011/0297251 A1* | 12/2011 | Huang | ................... | 137/485 |
| 2012/0024406 A1* | 2/2012 | Huang | ................... | 137/625 |

FOREIGN PATENT DOCUMENTS

| | | | | |
|---|---|---|---|---|
| CN | 201461585 U | * | 7/2009 | ............. F15B 13/044 |
| CN | 201486958 U | * | 8/2009 | ............. F15B 15/20 |
| CN | 101603554 A | | 12/2009 | |
| CN | 101608644 A | | 12/2009 | |
| CN | 201354780 Y | | 12/2009 | |
| CN | 101943188 A | | 1/2011 | |
| CN | 201851414 U | | 6/2011 | |
| CN | 203892305 U | * | 10/2014 | ............. F15B 21/04 |
| WO | 2004099657 A1 | | 11/2004 | |

* cited by examiner

COMPACT TWO-WAY CARTRIDGE VALVE USING COMBINED FLANGE-CONTROLLED PLATE

AREA OF THE DISCLOSURE

The present invention relates to hydraulic technical fields, more specially, involves hydraulic integrated control fields based on two-way cartridge valve.

TECHNOLOGY BACKGROUND OF THE DISCLOSURE

The current two-way cartridge valve products on the market are mainly applied for large power or flow situations in hydraulic drive and control systems. Though according to the basic characteristics of module, configuration, open and integration, the technology of the two-way cartridge valves is obviously better than the traditional spool valves based on plate connections, the applications on the market of the two-way cartridge valves are only a few tenth of plate-connected valves, especially in the medium and small power or flow situations, which are the majority of the market in the hydraulic drive and control system. This is not in accordance with the advantage of the technology of the two-way cartridge valves.

Through analysis the principle and structure of product and applications, the present inventor found that the two-way cartridge valve products are not only almost the only choice in integrated connections in the large power or flow situations, but also actually can be widely used in the medium and small power or flow situations, especially in the integrated connections.

The key of the technology is to overall realign the current two-way cartridge valve products on the market, especially to design the products of the specifications of 16 mm, 25 mm and so on reasonably and compactly. And it is necessary to add smaller and key specification of 10 mm products and mounting holes accordingly. So it is needed to realign pilot control valves, flanged covers, main stage of poppet valve and modular combinations.

The flanged covers are key of both structure and function, so the present inventor has applied for the patent—"combined flanged cover" (patent application No. 200920209385.7). The patent is not only reasonably and compactly designed and miniaturized the two-way cartridge valve covers, but also largely used "combined plugs" (patent application No. 200920174750.5) in the covers. And there are no or almost no slant-holes in the new structures of the covers. This is very good for manufacturing. Now the current products on the market, including advanced product series of most international famous companies, there are widely used slant holes in flanged covers, such as the widely used products of the international famous company in FIGS. 1, 2 and 3. The compact two-way cartridge valve products are a breakthrough not only on the current two-way cartridge valve products, but also on the traditional structures of covers.

Similarly, according to the principle and way of "Hydraulic Resistance Theory", the compact two-way cartridge valve miniaturized realigns the pilot control valves and main stage of seated poppet valve based on ISO7368 mounting hole. The applications of the compact two-way cartridge valve products shows that the products can be widely used in the medium and small power or flow situations of the integrated control system. And the products can overall realign the current two-way cartridge valve products on the market and can innovate MINISO two-way cartridge valve and series combined products in the specifications of 10 mm, 16 mm, 25 mm, 32 mm. The products may impact the application of market and current hydraulic control components deeply.

BRIEF SUMMARY OF THE INVENTION

It is an object of the present invention to design the products compact, miniaturized and reasonable while maintaining and adding the current basic advantage of the technology of the two-way cartridge valves, so the products can easily be modular, configurable and open combined products and can form multi-level integrated connections.

To solve the above problem, the technical solution of the invention is this:

The present invention uses combined flanged covers, and more reasonable and miniaturized pilot control valves and combinations based on mounting surfaces conformed to ISO 4401-02 or CETOP-02, and especially miniaturized pilot control assemblies. At the same time the present invention reasonably and miniaturized improved the main stage of seated poppet valve.

The present invention innovate the specifications of 10 mm two-way cartridge valve control assembly and corresponding mounting hole, so the size and weight of new two-way cartridge valve products are obviously decreased. These key and important ways can break the quo-status that currently the two-way cartridge valve products are widely used in the large power and flow situations, and can promote the application in the medium and small power or flow situations, which are the majority of the market in the hydraulic drive and control system.

The present invention has partly changed the mounting dimensions conformed to ISO7368 to make it more reasonable and compact, so it can enlarge the application in the medium and small power or flow situations. And in the specifications of 16 mm, 25 mm, the size of mounting hole of main stage of seated poppet valve is almost the same as ISO7368, so it can assure that the key function of pressure-flow curve will be the same. At the premise of maintaining the size of screw connection of flanged cover and assuring the reliability of seal in the internal mounting surfaces, the present invention reasonably decreased the distance of four screw holes, so it is good for the decrease of the overall size, weight and the reliability of seal.

The miniaturization and compact of main stage of seated poppet valve, flanged covers combined with the above miniaturized and compact pilot control valves, can assure the compact structure of the new two-way cartridge valve control assemblies. And the additional specification of 10 mm is very important. So far in ISO7368, the smallest mounting specification is 16 mm.

Through the above realignment and innovation, the present invention not only has done overall rationalization and compact on the current two-way cartridge valve products, but also has innovated smaller specification series, which are specifications of 10 mm, 16 mm, 25 mm, 32 mm four MINISO products series. The present invention can make the two-way cartridge valves applied for medium and small power or flow situations, which are the majority of the market in the hydraulic drive and control system. Especially in integrated connections, the present invention can overall replace the three kinds of hydraulic control components based on traditional spool valves. This may impact the application of market and current hydraulic control components deeply.

In order to acquire the realignment and the structure innovation, the technical program of the compact two-way cartridge valve products is to use compact two-way cartridge valve with combined flanged covers. The compact two-way cartridge valve product includes combined flanged covers, miniaturized pilot control assemblies and main stage of seated poppet valve. When the combined flanged cover has no external mounting surfaces, the compact two-way cartridge valve product includes combined flanged covers and miniaturized main stage of seated poppet valve based on mounting holes conformed to ISO7368.

As the structural and functional diversity of the above miniaturized pilot control assemblies and combined flanged covers and main stage of seated poppet valve, so the three assemblies can configure a large number of flexible compact two-way cartridge valve product family. At the same time, it can acquire kinds of modular combined hydraulic control valves and integrated control systems based on the compact two-way cartridge valves.

The products as followed are some kinds of products and combinations of the compact two-way cartridge valves based on combined flanged covers. The two-way cartridge valve products are also called two-way cartridge valve control assemblies.

1, A two-way cartridge valve directional control assembly. The so-called combined flanged cover is the combined flanged cover with internal throttling plug and without external mounting surface. The so-called main stage of seated poppet valve is main stage of seated poppet valve with directional control function. The above combined flanged cover and main stage of seated poppet valve consists of the two-way cartridge valve directional control assembly.

2, A two-way cartridge valve directional throttling control assembly. The so-called combined flanged cover is the combined flanged cover with internal throttling plug and stroke adjustment device for main stage of seated poppet valve and without external mounting surface, the main stage of seated poppet valve is the main stage of seated poppet valve with directional and throttling control functions. The above combined flanged cover and main stage of seated poppet valve consists of the two-way cartridge valve directional throttling control assembly with stroke adjustment device.

3, A two-way cartridge valve pressure control assembly. The so-called combined flanged cover is the combined flanged cover with internal throttling plug and miniaturized screw cartridge valve pilot pressure valve and without external mounting surface. The so-called main stage of seated poppet valve is the main stage of seated poppet valve with pressure control functions, such as overflow, stress reduction, back pressure and sequence functions. The above combined flanged cover and the main stage of seated poppet valve consists of the two-way cartridge valve pressure control assembly.

4, A two-way cartridge valve pressure control assembly. The so-called combined flanged cover is the combined flanged cover without external mounting surface and the axis of the pilot valve is vertical installed, which is consistent with the main stage of seated poppet valve. The so-called main stage of seated poppet valve is the main stage of seated poppet valve with pressure control functions, such as overflow, stress reduction, back pressure and sequence functions. The above combined flanged cover and the main stage of seated poppet valve consists of the two-way cartridge valve pressure control assembly.

5, A two-way cartridge valve control assembly. The so-called combined flanged cover is the combined flanged cover without external mounting surface and with pilot control pressure choice functions and two internal combined plugs. One of the two plugs can internally be with check valve or throttling plug, the other one can internally be with check valve or shuttle valve. The so-called main stage of seated poppet valve is the main stage of seated poppet valve with directional or pressure compensation functions. The above combined flanged cover and the main stage of seated poppet valve consists of the two-way cartridge valve control assembly with pilot directional control valve or with pressure compensation valve.

6, A two-way cartridge valve pressure control assembly with screw cartridge valve. The so-called combined flanged cover is the combined flanged cover without external mounting surfaces and with complex internal combinations of pilot control assemblies in the plate. The combined flanged cover has two pilot control valves with the same size of the mounting holes. One of the two pilot control valves is miniaturized screw pilot pressure valve, the other one is miniaturized screw directional valve. The main stage of seated poppet valve is the main stage of seated poppet valve with pressure control functions. The above combined cover and the main stage of seated poppet valve consists of the two-way cartridge valve pressure control assembly with screw cartridge valve.

7, A two-way cartridge valve directional control assembly with pilot directional control valve. The so-called combined flanged cover is the combined flanged cover with one or two internal combined plugs with internal throttling plugs and external mounting surface on the top of the plate, on which pilot solenoid directional valve can be installed. The so-called main stage of seated poppet valve is switch-type main stage of seated poppet valve with the corresponding function to the above flanged cover. The above combined flanged cover and the main stage of seated poppet valve consists of the two-way cartridge valve directional control assembly with pilot directional control valve.

8, A two-way cartridge valve control assembly. The so-called combined flanged cover is the combined flanged cover with a combined plug with internal throttling plug and a combined plug with internal shuttle valve. The top of the plate is an external mounting surface, a switch-type pilot solenoid directional valve is installed on the mounting surface. The so-called main stage of seated poppet valve is the main stage of seated poppet valve with directional function. The above combined flanged cover and the main stage of seated poppet valve consists of the two-way cartridge valve control assembly.

9, A two-way cartridge valve control assembly. The so-called combined flanged cover is the combined flanged cover with a combined plug with internal throttling plug and a stroke adjustment device for the main stage of seated poppet valve. The side of the plate is an external mounting surface. The stroke adjustment device also can be a displacement sensor device. The so-called main stage of seated poppet valve is the main stage of seated poppet valve with directional and flow control functions. The above combined flanged cover and the main stage of seated poppet valve consists of the two-way cartridge valve control assembly with stroke adjustment and displacement measurement for poppet.

10, A two-way cartridge valve control assembly. The so-called combined flanged cover is the combined flanged cover with a combined plug with an internal throttling plug. A displacement sensor device for main stage of seated poppet valve and a screw miniaturized proportional control cartridge valve is installed on the top of the plate, whose axis are parallel. The main stage of seated poppet valve is the main stage of seated poppet valve with the corresponding functions to the above flanged cover. The above combined flanged cover and the main stage of seated poppet valve consists of the two-way cartridge valve proportional control and throttling assembly with poppet displacement electrical feedback function.

11, A two-way cartridge valve control assembly. The so-called combined flanged cover is the combined flanged cover with an internal combined plug with an internal throttling plug. A directional screw cartridge valve is installed on the top of the plate. The pilot assembly can be a switch-type control valve or a proportional control valve. The so-called main stage of seated poppet valve can be a switch main stage of seated poppet valve with corresponding functions to the flanged cover or a proportional control main stage of seated poppet valve with mechanical feedback structure. The above combined flanged cover and the main stage of seated poppet valve consists of the two-way cartridge valve directional control assembly with screw cartridge valve or the two-way cartridge valve proportional control and throttling assembly with internal mechanical feedback function.

12, A two-way cartridge valve control assembly. The so-called combined flanged cover is the combined flanged cover with an internal combined plug with a throttling plug and a pilot pressure valve. The top of the plate is an external mounting surface, a switch pilot solenoid directional valve is installed on the mounting surface. The main stage of seated poppet valve is the main stage of seated poppet valve with pressure control function. The above combined flanged cover and the main stage of seated poppet valve consists of the two-way cartridge valve pressure control assembly with two-position pilot solenoid directional valve.

13, A two-way cartridge valve control assembly. The so-called combined flanged cover is the combined flanged cover with an internal combined plug with a throttling plug and a pilot pressure valve and an external mounting surface. A sandwich combination of pilot pressure control valves and a switch ¾way pilot solenoid directional valve is installed on the mounting surface. The main stage of seated poppet valve is the main stage of seated poppet valve with pressure control function. The above combined flanged cover and the main stage of seated poppet valve consists of the two-way cartridge valve control assembly with optional high or low pressure choice.

14, A two-way cartridge valve control assembly. The so-called combined flanged cover is the combined flanged cover with an internal combined plug with a throttling plug and a pilot pressure valve based on mounting hole of combined plug and an external mounting surface. A proportional pilot pressure valve is installed on the mounting surface. The main stage of seated poppet valve is the main stage of seated poppet valve with pressure control function. The above combined flanged cover and the main stage of seated poppet valve consists of the two-way cartridge valve control assembly with proportional pressure control function.

The above details are just part of the compact two-way cartridge valve products with combined flanged cover of the present invention. According to this principle and key technology of the present invention, there can be more two-way cartridge valve products.

The present invention can not only use switch control but also can use proportional servo control and digital control and so on. And the present invention can merge microelectronics and CAN bus, which include control, feedback, detection and communication. The present invention can use in the special and extreme environment such as anti-corrosion, explosion-proof situations after taking some appropriate measures. Then the present invention is more efficient and reasonable, and more environmentally friendly and green manufacturing.

The technical program of the present invention is to realign and innovate the current two-way cartridge valve products on the market and change the status that the two-way cartridge valve products are mainly applied for large power or high pressure situations. Then the present invention make the two-way cartridge valve products fully work in the medium and small power or flow situations, which are the majority of the market. So the present invention can make the two-way cartridge valve control technology, such as modular, configurable, open and integrated technologies, more powerful.

After the realignment and innovation, the MINISO compact two-way cartridge valve products with combined flanged cover maintain and increase the key technical specifications, such as pressure-flow curve, switch, leak-free and variety of functions.

After the realignment and innovation, the MINISO compact two-way cartridge valve products based on a series of key technologies make the combinations of new products more competitive than mechanical and electronically drive on the specific power. The increase can be 20 to 30 percentages averagely. This is an advantage in the hydraulic drive, especially in the medium and small power situations.

After the realignment and innovation, the MINISO compact two-way cartridge valve products can acquire many kinds of flexible combinations. The products can satisfy the needs of the various control and integrations in the industry and mobile hydraulics. The new products are more compact, miniaturized, efficient and less energy consumption, more environmentally friendly, green and low-carbon. And the entire chain is more reasonable and flexible.

DETAILED DESCRIPTION OF THE PREFERRED EMBODIMENT

In order to easily understand the technical means, characteristics, function and effect of the present invention, now referring to drawings to explain the present invention in detail.

Figure 1:
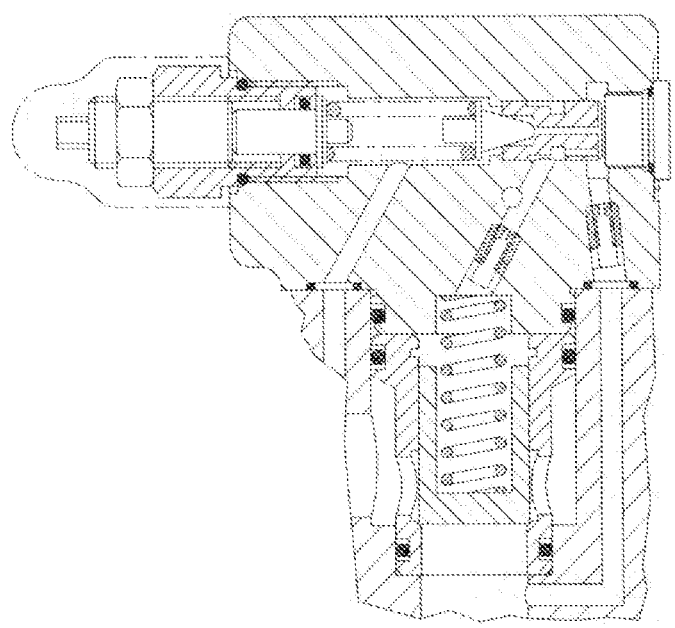
FIG. 1 is a structural schematic of a typical pressure control assembly product in the current two-way cartridge valve products.
Figure 3:
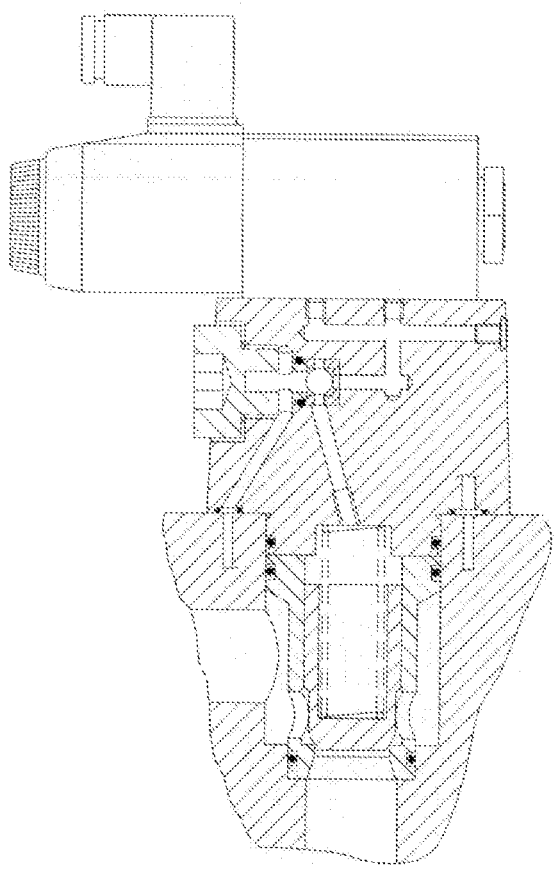
FIG. 3 is a structural schematic of another typical directional control assembly product with pilot solenoid valve and shuttle valve in the current two-way cartridge valve products.
Figure 4:
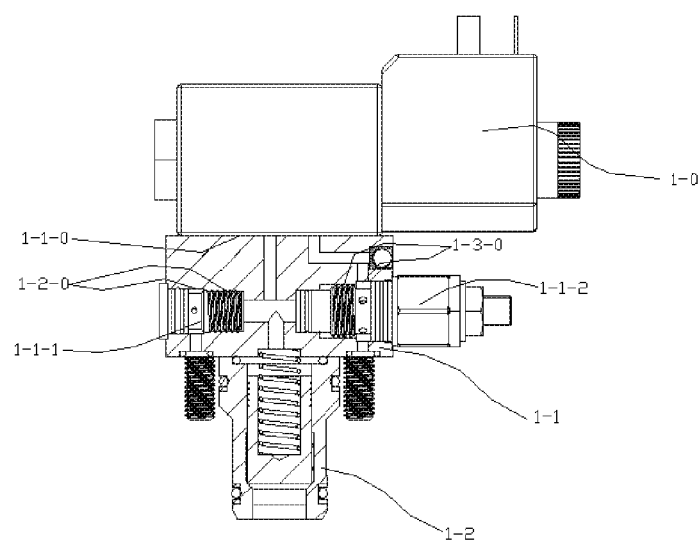
FIG. 4 is a structural schematic of MINISO compact pressure control cartridge valve assembly with two-position pilot solenoid valve.

FIG. 4 is a structural schematic of MINISO compact two-way pressure control cartridge valve assembly with pilot solenoid valve. The flanged cover is a combined flanged cover. There is a combined plug with internal throttling plug and a screw pilot pressure valve in the plate. The present invention especially designs mounting holes for combined plug and pilot pressure valve. The mounting holes are not slant-holes basically. This is more reasonable than the products in FIGS. 1, 2 and 3 from the international companies. And the straight holes are easily to be manufactured.

There is an external mounting surface on the top of the combined flanged cover. The pilot control valve conformed to ISO4401-02 or CETOP-02 can be installed on the mounting surface. In the FIG. 4 is 2/4 way solenoid directional valve. Obviously the pilot control valves are more reasonable than the pilot valves conformed to ISO4401-03. The main stage of seated poppet valve is a basic pressure control cartridge valve based on ISO7368, but it is miniaturized.

Further, MINISO compact two-way cartridge valve pressure control assembly with pilot solenoid valve includes a pilot solenoid directional valve 1-0, which includes combined plug 1-1-1 based especially plug mounting hole 1-2-0 and a miniaturized screw connected pilot pressure cartridge valve 1-1-2 based on especially mounting hole 1-3-0, combined flanged plate 1-1 with external mounting surface 1-1-0 conformed to ISO4401-02 or CETOP-02, a miniaturized main stage of seated poppet valve 1-2 with mounting hole conformed to ISO7368.

Figure 2:
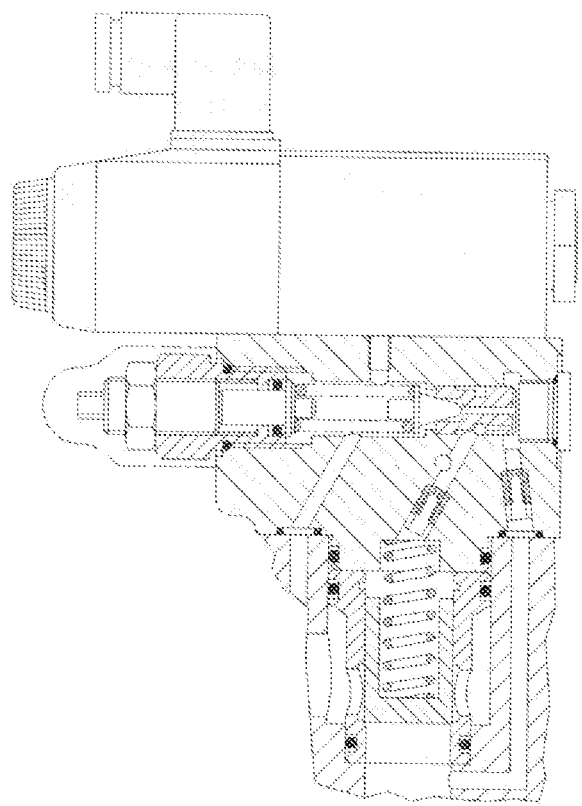
FIG. 2 is a structural schematic of another typical pressure control assembly product with pilot solenoid valve in the current two-way cartridge valve products.
Figure 5:
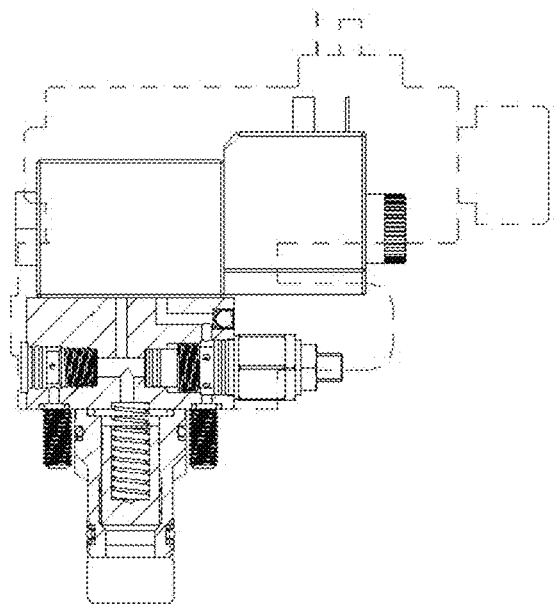
FIG. 5 is a structural comparison schematic between compact two-way cartridge valve and current two-way cartridge valve.

FIG. 5 is a structural comparison schematic between compact two-way cartridge valve assembly with combined flanged cover in FIG. 4 and current two-way cartridge valve in FIG. 2 on the market. When the two products have the same control functions and technical parameters, the size and weight of the new product is smaller 20 to 30 percentages than the traditional product. When the drive power is the same, the specific power of the new product is larger 20 to 30 percentages than the traditional product.

Figure 6:
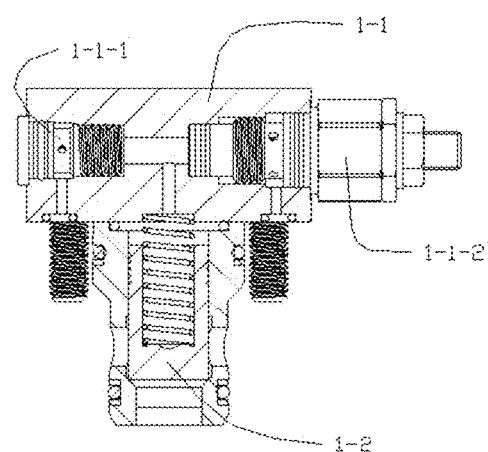
FIG. 6 is a structural schematic of a basic two-way pressure control cartridge valve assembly.

FIG. 6 is a structural schematic of a basic two-way pressure control cartridge valve assembly. The product includes combined flanged cover 1-1, which includes a combined plug 1-1-1 with internal throttling plug, a miniaturized screw connected pilot pressure valve 1-1-2, a miniaturized main stage of seated poppet valve 1-2 with mounting hole conformed to ISO7368.

Figure 7:
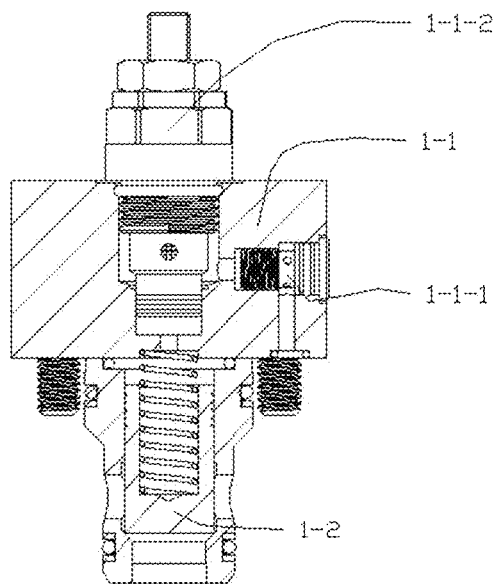
FIG. 7 is a structural schematic of another basic two-way pressure control cartridge valve assembly.

FIG. 7 is a structural schematic of another basic two-way pressure control cartridge valve assembly. The product includes combined flanged cover 1-1, which includes a combined plug 1-1-1 with internal throttling plug, a miniaturized vertical installed screw connected pilot pressure valve 1-1-2, a miniaturized main stage of seated poppet valve 1-2 with mounting hole conformed to ISO7368.

Figure 8:
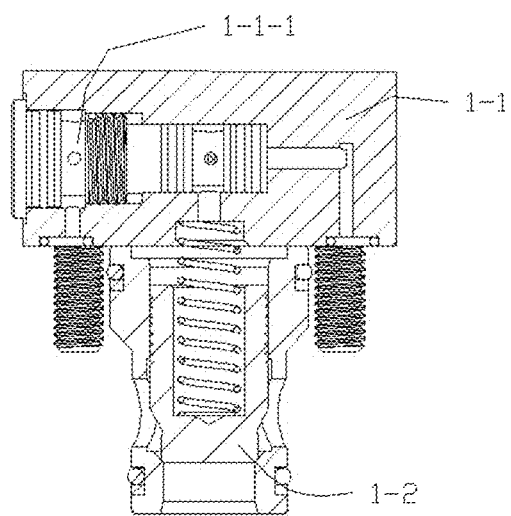
FIG. 8 is a structural schematic of a two-way cartridge valve assembly with pilot pressure choice function.

FIG. 8 is a structural schematic of a two-way cartridge valve assembly with pilot pressure choice function. The product includes combined flanged cover 1-1, which includes a combined plug 1-1-1 with internal throttling plug, a miniaturized main stage of seated poppet valve 1-2 with mounting hole conformed to ISO7368.

Figure 9:
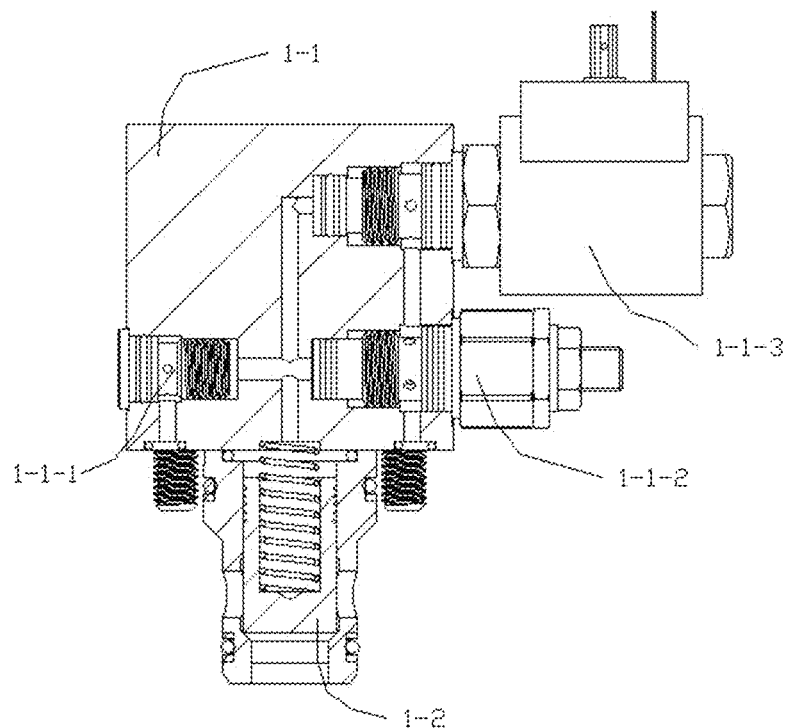
FIG. 9 is a structural schematic of a two-way pressure control cartridge valve assembly with screw cartridge valve.

FIG. 9 is a structural schematic of a two-way pressure control cartridge valve assembly with screw cartridge valve. The product includes a combined flanged cover 1-1, which includes a combined plug 1-1-1 with internal throttling plug, a miniaturized screw connected pilot pressure valve 1-1-2 and a miniaturized screw connected pilot directional solenoid valve 1-1-3 based on the same mounting hole as 1-1-2 and a miniaturized main stage of seated poppet valve 1-2 of pressure control function with mounting hole conformed to ISO7368.

Figure 10:
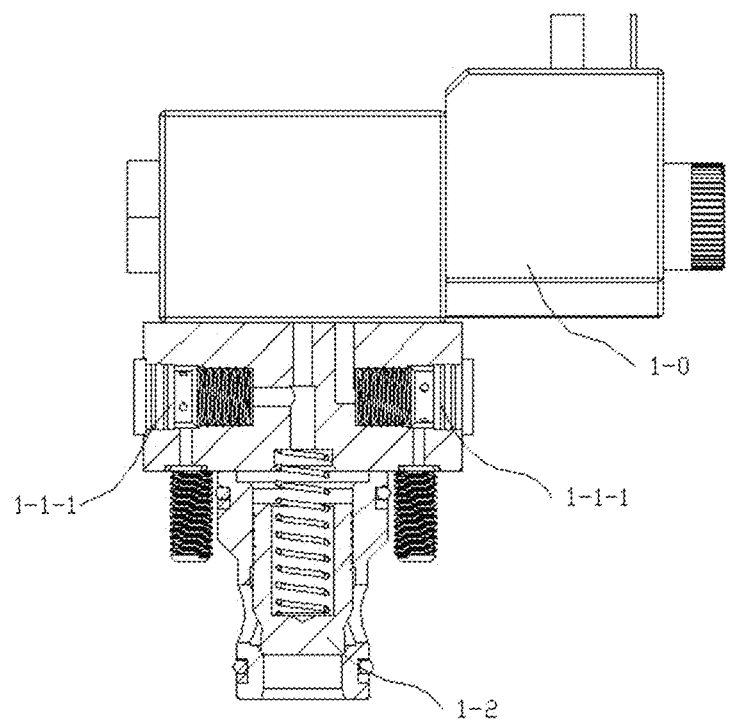
FIG. 10 is a structural schematic of a two-way directional control cartridge valve assembly with pilot directional control valve.

FIG. 10 is a structural schematic of a two-way directional control cartridge valve assembly with pilot directional control valve. The product includes a combined flanged cover with external mounting surface conformed to ISO4401-02 or CETOP-RE121H-42-4-P02, which includes combined plug 1-1-1 with one or two internal throttling plugs and miniaturized pilot solenoid directional valve 1-1-0 with mounting surface conformed to ISO4401-02 or CETOP-RE121H-42-4-P02, a miniaturized main stage of seated poppet valve 1-2 with mounting hole conformed to ISO7368.

Figure 11:
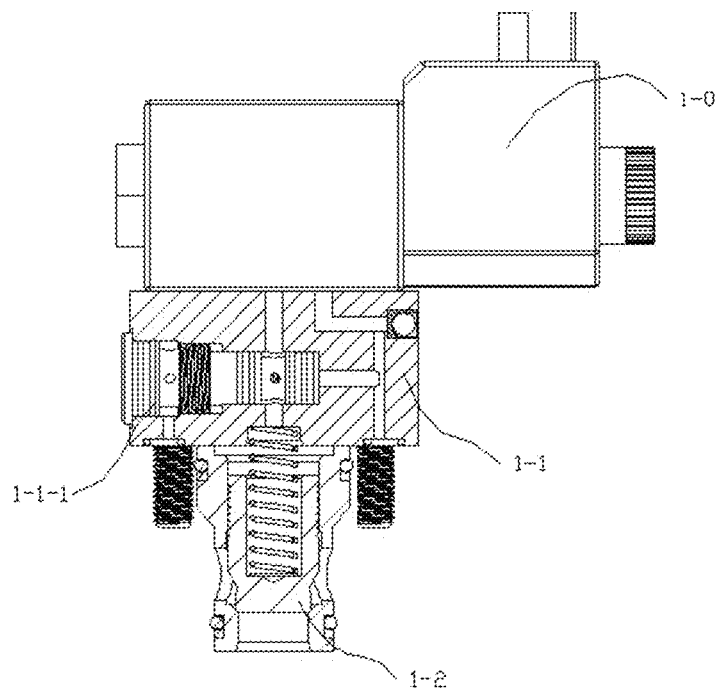
FIG. 11 is a structural schematic of a two-way cartridge valve assembly with pilot solenoid valve and shuttle valve in the flanged plate.

FIG. 11 is a structural schematic of a two-way cartridge valve assembly with pilot solenoid valve and shuttle valve in the flanged plate. The product includes a combined flanged cover with external mounting surface conformed to ISO4401-02 or CETOP-RE121H-42-4-P02 on the top of it, which includes combined plug 1-1-1 with throttling plugs and miniaturized pilot solenoid directional valve 1-0 with mounting surface conformed to ISO4401-02 or CETOP-RE121H-42-4-P02, a miniaturized main stage of seated poppet valve 1-2 with mounting hole conformed to ISO7368.

Figure 12:
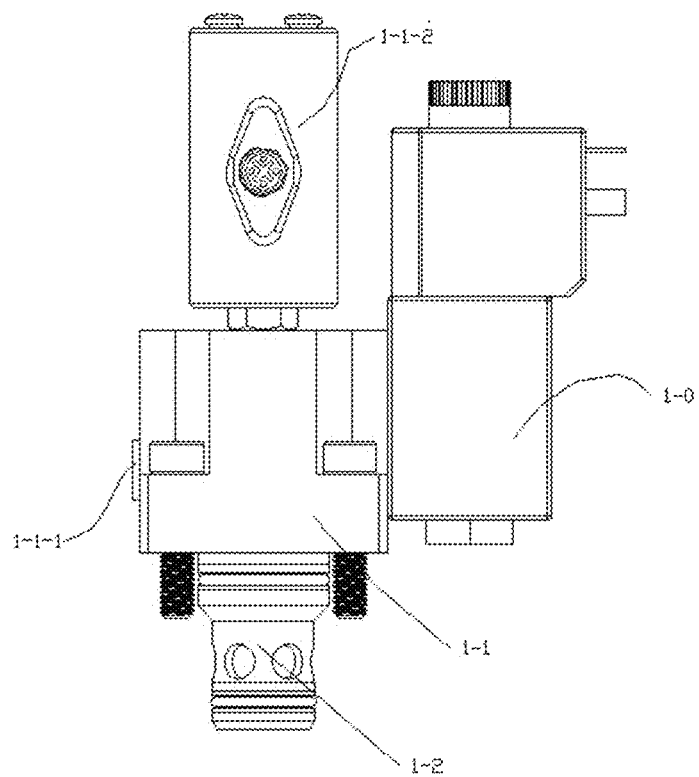
FIG. 12 is a structural schematic of a two-way cartridge valve assembly with spool stroke adjustment and displacement measurement for poppet.

FIG. 12 is a structural schematic of a two-way cartridge valve assembly with spool stroke adjustment and displacement measurement. The product includes a combined flanged cover with external mounting surface conformed to ISO4401-02 or CETOP-RE121H-42-4-P02 on the side of it, which includes combined plug 1-1-1 with throttling plugs and a displacement measurement 1-1-2 and a miniaturized pilot solenoid directional valve or proportional pilot solenoid directional valve 1-0 with mounting surface conformed to ISO4401-02 or CETOP-RE121H-42-4-P02, a miniaturized main stage of seated poppet valve 1-2 with directional and flow control functions.

Figure 13:
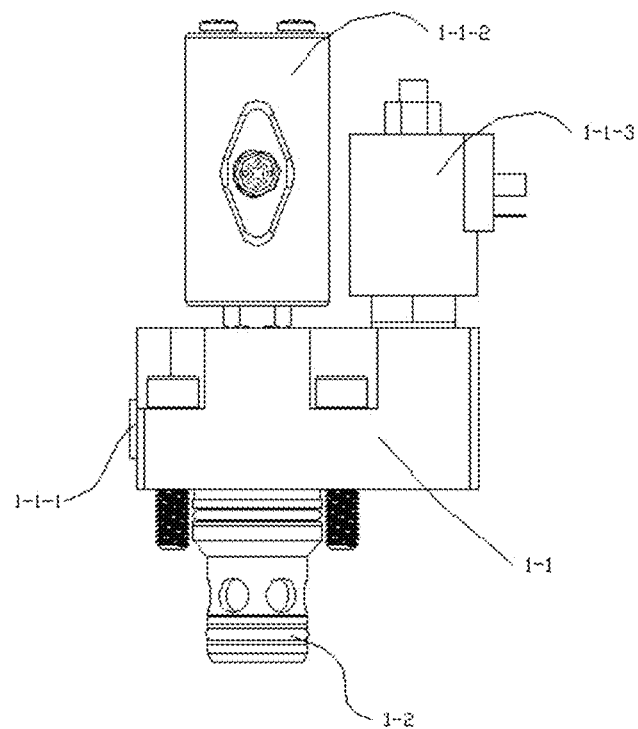
FIG. 13 is a structural schematic of a proportional two-way cartridge valve assembly with poppet displacement electrical feedback function.

FIG. 13 is a structural schematic of a proportional two-way cartridge valve assembly with poppet displacement electrical feedback function. The product includes a combined flanged cover 1-1, which includes a combined plug 1-1-1 with throttling plug and a screw connected miniaturized proportional screw cartridge valve 1-1-3 and a displacement sensor device (LVDT) 1-1-2 for main stage of seated poppet valve on the top of it, a proportional main stage of seated poppet valve 1-2 with corresponding functions.

Figure 14:
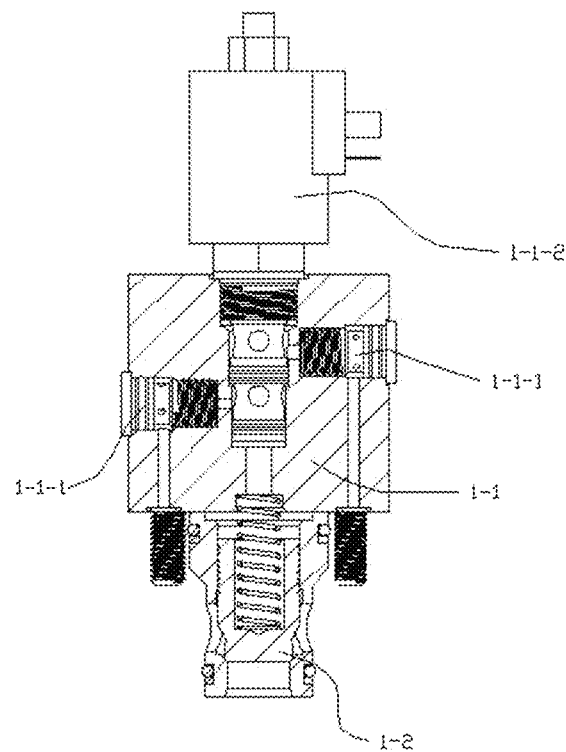
FIG. 14 is a structural schematic of a proportional two-way cartridge valve assembly with screw directional control valve or with mechanical feedback function.

FIG. 14 is a structural schematic of a proportional two-way cartridge valve assembly with screw directional control valve or with mechanical feedback function. The product includes a combined flanged cover 1-1, which includes a combined plug 1-1-1 with throttling plug and a screw cartridge valve 1-1-2 and this screw cartridge valve could be a switch control valve or a proportional control valve, a main stage of seated poppet valve 1-2, which could be a switch main stage of seated poppet valve with corresponding functions or a proportional main stage of seated poppet valve with mechanical feedback functions.

Figure 15:
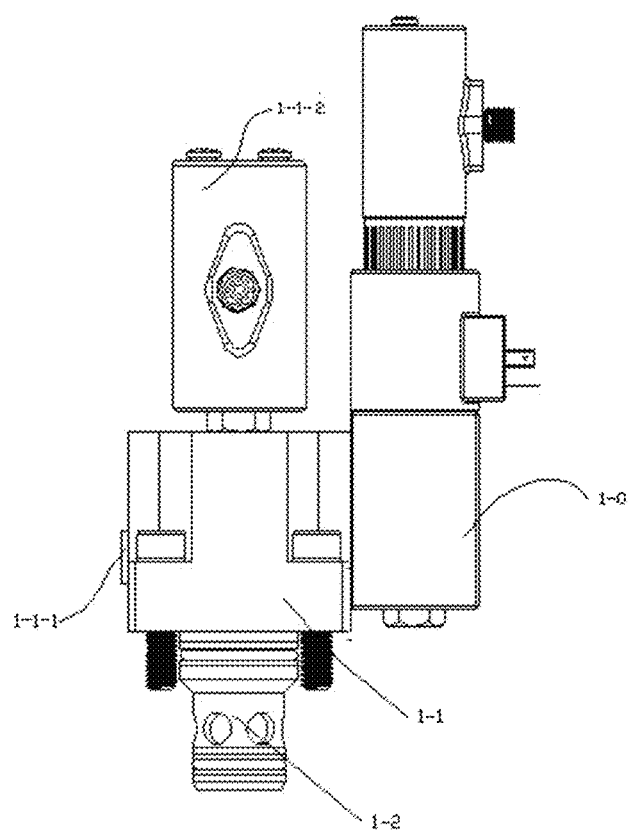
FIG. 15 is a structural schematic of a two-way cartridge valve assembly with poppet displacement measurement of the main stage of seated poppet valve.

FIG. 15 is a structural schematic of a two-way cartridge valve assembly with poppet displacement measurement of the main stage of seated poppet valve. The product includes a combined flanged cover with external mounting surface conformed to ISO4401-02 or CETOP-RE121H-42-4-P02 on the side of it, which includes combined plug 1-1-1 with internal throttling plugs and a displacement measurement 1-1-2 and a miniaturized proportional pilot solenoid directional valve 1-0 with displacement electronically feedback functions, a miniaturized main stage of seated poppet valve 1-2 with flow control functions.

Figure 16:
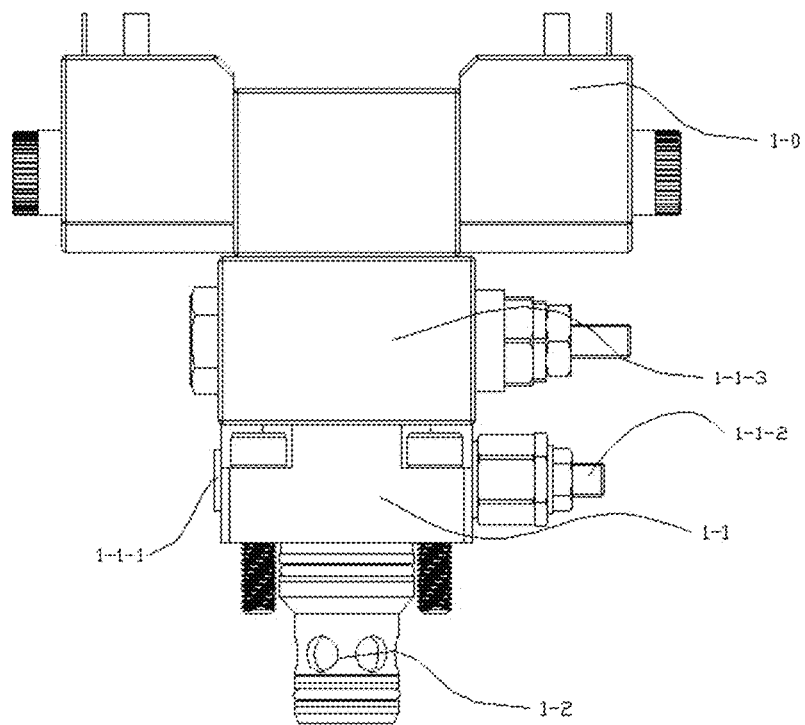
FIG. 16 is a structural schematic of a two-way pressure control cartridge valve assembly with optional high or low pressure choice.

FIG. 16 is a structural schematic of a two-way pressure control cartridge valve assembly with optional high or low pressure choice. The product includes a combined flanged cover 1-1 with an external mounting surface conformed to ISO4401-02 or CETOP-02, which includes a combined plug 1-1-1 with internal throttling plug and a miniaturized screw connected pilot pressure valve 1-1-2, a main stage of seated poppet valve 1-2 with pressure control function. A switch ¾way pilot solenoid directional valve 1-0 and a sandwich pilot pressure control valve 1-1-3 is installed on the top mounting surface.

Figure 17:
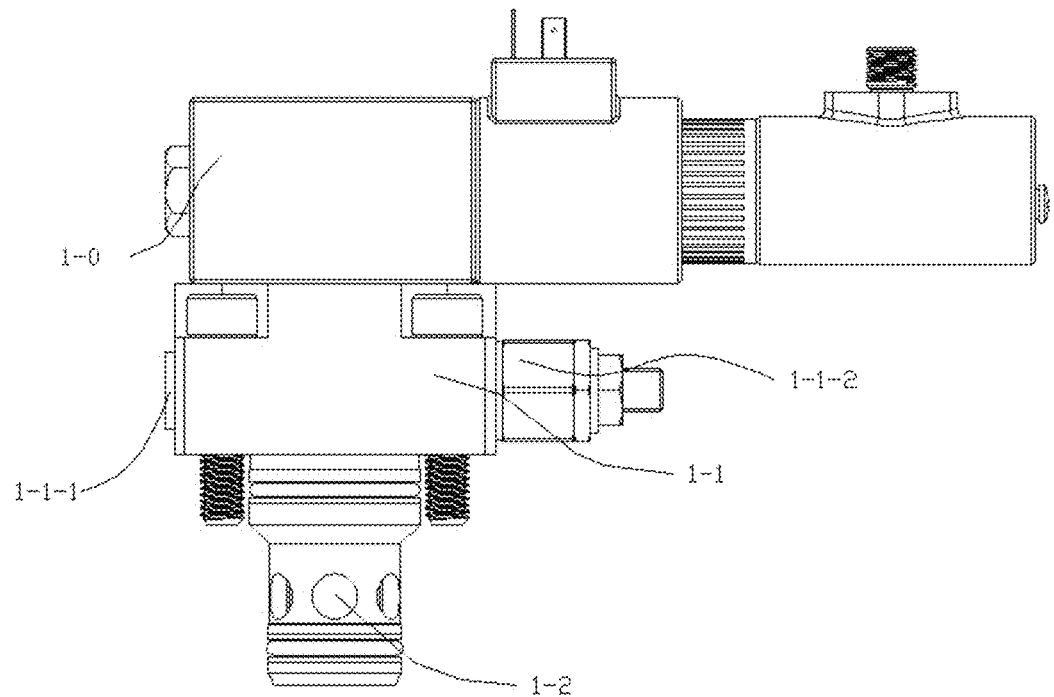
FIG. 17 is a structural schematic of a two-way cartridge valve pressure control assembly with proportional control functions.

FIG. 17 is a structural schematic of a two-way cartridge valve pressure control assembly with proportional control functions. The product includes a combined flanged cover 1-1 with an external mounting surface conformed to ISO4401-02 or CETOP-02, which includes a combined plug 1-1-1 with internal throttling plug and a miniaturized screw connected pilot pressure valve 1-1-2, a main stage of seated poppet valve 1-2 with pressure control function. A pilot pressure valve 1-0 is installed on the top mounting surface.

Figure 18:
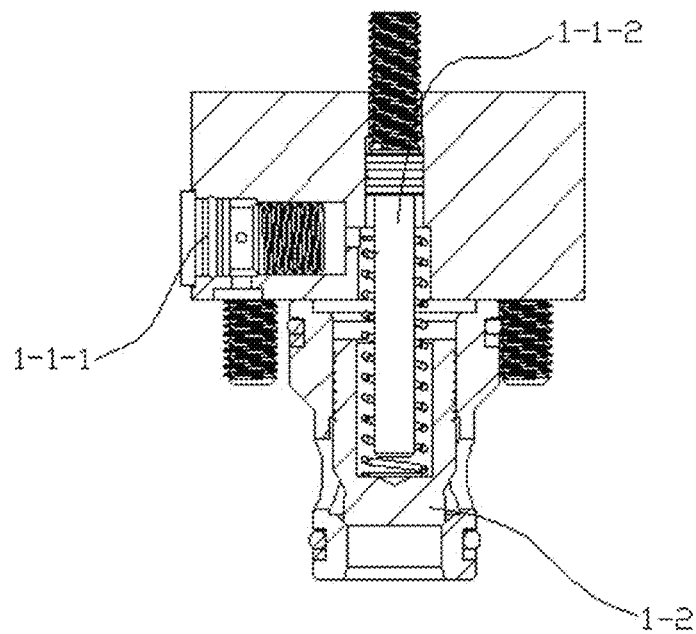
FIG. 18 is a structural schematic of a basic two-way directional and flow control cartridge valve assembly.

FIG. 18 is a structural schematic of a basic two-way directional and flow control cartridge valve assembly. The product includes a combined flanged cover 1-1, which includes a combined plug 1-1-1 with internal throttling plug and a displacement measure device 1-1-2, a miniaturized main stage of seated poppet valve 1-2 with mounting hole conformed to ISO7368.

Figure 19:
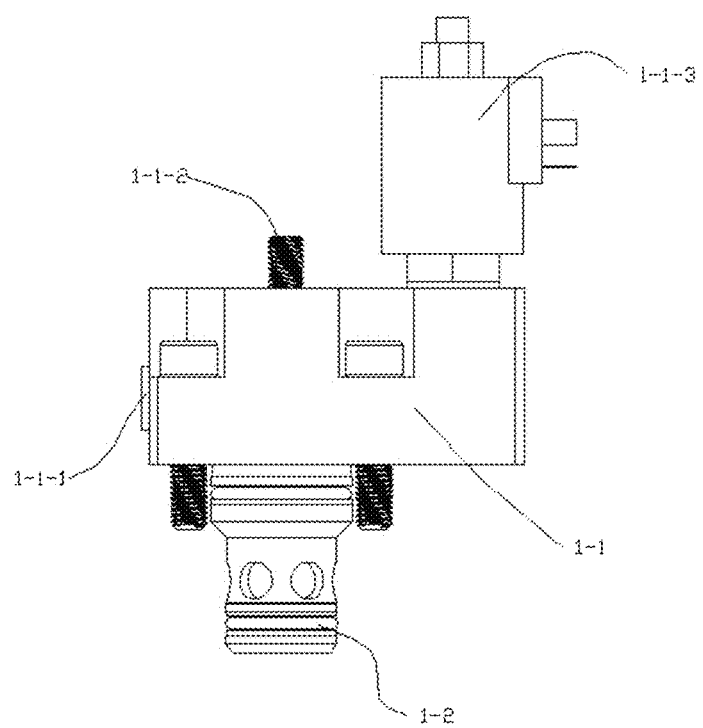
FIG. 19 is a structural schematic of an electro-hydraulic compact two-way cartridge valve directional throttling control assembly with screw pilot solenoid valve and poppet stroke adjustment.

FIG. 19 is a structural schematic of an electro-hydraulic compact two-way cartridge valve directional control assembly with screw pilot solenoid valve and poppet stroke adjustment. The product includes a combined flanged cover 1-1, which includes a combined plug 1-1-1 with internal throttling plugs and a displacement measure device 1-1-2 and a screw cartridge pilot solenoid valve 1-1-3, a miniaturized main stage of seated poppet valve 1-2 with mounting hole conformed to ISO7368.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

The invention claimed is:

1. A compact two-way cartridge valve comprising:
a combined flanged cover,
a first pilot control valve,
a sandwich pilot pressure control valve,
a switch ¾ way pilot solenoid directional valve,
a poppet valve,
wherein the combined flanged cover includes a combined plug with an internal throttling plug, a pressure valve positioned in a first mounting hole of the combined flanged cover, and an external mounting surface for mounting a sandwich combination of a sandwich pilot pressure control valves and a switch ¾ way pilot solenoid directional valve, and
wherein the poppet valve has a pressure control function.

2. The compact two-way cartridge valve as defined in claim 1 wherein the combined flanged cover includes a second pilot control valve positioned in a second mounting hole, the second mounting hole having the same size as the first mounting hole, wherein one of the first and second pilot control valves is a miniaturized screw pilot pressure valve, and wherein the other of the first and second pilot control valves is a screw directional valve.

3. The compact two-way cartridge valve as defined in claim 1 wherein the combined flanged cover further includes a stroke adjustment device of the poppet valve, wherein the poppet valve has directional and throttling functions.

4. The compact two-way cartridge valve as defined in claim 1 wherein the combined flanged cover further includes a throttling plug and a miniaturized screw pilot pressure valve, wherein the poppet valve has pressure relief, stress reducing, back pressure or sequence functions.

5. The compact two-way cartridge valve as defined in claim 1 wherein the pilot valve extends along an axis substantially perpendicular to the external mounting surface.

6. The compact two-way cartridge valve as defined in claim 1 wherein the combined flanged cover further includes a first internal combined plug having a check valve or a throttling plug, and a second internal combined plug having a check valve or a shuttle valve, wherein the poppet valve has a directional or pressure compensation function.

7. The compact two-way cartridge valve as defined in claim 1 wherein the poppet valve has a directional control function.

8. The compact two-way cartridge valve as defined in claim 1 wherein the combined flanged cover further includes one or two internal combined plugs with internal throttling plugs on which pilot solenoid directional valves can be the installed, wherein the poppet valve has a main stage with directional control function.

9. The compact two-way cartridge valve as defined in claim 1 wherein the combined flanged cover further includes a combined plug with an internal shuttle valve on which a switch-type pilot solenoid directional valve can be the installed, wherein the poppet valve has a main stage with directional control function.

10. The compact two-way cartridge valve as defined in claim 1 wherein the combined flanged cover further includes a stroke adjustment device for the poppet valve, wherein the poppet valve includes a displacement sensor device, and wherein the poppet valve has a main stage with directional and flow control functions.

11. The compact two-way cartridge valve as defined in claim 1 wherein the combined flanged cover further includes a displacement sensor for the poppet valve, and a screw miniaturized proportional control cartridge valve, wherein the poppet valve has a main stage with a proportional throttling function.

12. The compact two-way cartridge valve as defined in claim 1 wherein the combined flanged cover further includes a switch-type or a proportional directional screw cartridge valve, wherein the poppet valve has a switch-type main stage.

13. The compact two-way cartridge valve as defined in claim 1 wherein the combined flanged cover further includes a pilot pressure valve positioned in a combined plug mounting hole on which a proportional pressure valve is installed, wherein the poppet valve has a main stage with a pressure control function.

\* \* \* \* \*